United States Patent
Engelhardt

(10) Patent No.: US 10,637,254 B2
(45) Date of Patent: Apr. 28, 2020

(54) SPREAD SPECTRUM FOR SWITCH MODE POWER SUPPLIES

(71) Applicant: LINEAR TECHNOLOGY CORPORATION, Milpitas, CA (US)

(72) Inventor: Michael Thomas Engelhardt, Sunnyvale, CA (US)

(73) Assignee: Linear Technology Corporation, Milpitas, CA (US)

( * ) Notice: Subject to any disclaimer, the term of this patent is extended or adjusted under 35 U.S.C. 154(b) by 310 days.

(21) Appl. No.: 14/869,114

(22) Filed: Sep. 29, 2015

(65) Prior Publication Data
US 2016/0276839 A1    Sep. 22, 2016

Related U.S. Application Data

(60) Provisional application No. 62/135,553, filed on Mar. 19, 2015.

(51) Int. Cl.
*H02J 4/00*     (2006.01)
*H02M 1/44*    (2007.01)
*H02M 1/12*    (2006.01)

(52) U.S. Cl.
CPC ............. *H02J 4/00* (2013.01); *H02M 1/12* (2013.01); *H02M 1/44* (2013.01)

(58) Field of Classification Search
CPC ........... H02J 4/00; H02M 1/44; H02M 3/156; H02M 1/12; H02P 1/00; H03L 7/00; H04B 1/69

(Continued)

(56) References Cited

U.S. PATENT DOCUMENTS 4,814,725 A * 3/1989 Vitiello ............. G11B 20/1403
                                                                  331/1 A
5,003,454 A * 3/1991 Bruning ............. H02M 1/4225
                                                                  363/81

(Continued)

FOREIGN PATENT DOCUMENTS

CN       1738189 A      2/2006
CN     101584136 A     11/2009

(Continued)

OTHER PUBLICATIONS

International Search Report and Written Opinion dated Sep. 20, 2016, issued in corresponding PCT/US2016/020022 (11 pgs.).

(Continued)

*Primary Examiner* — Thienvu V Tran
*Assistant Examiner* — Brian K Baxter
(74) *Attorney, Agent, or Firm* — Schwegman Lundberg & Woessner, P.A.

(57) ABSTRACT

A switch mode power supply may utilize a switching signal to control one or more power switches in the switch mode power supply. A switch mode power supply controller may generate and/or control this switching signal. The controller may reduce the peak spectral noise of the switch mode power supply by varying the instantaneous switching frequency at a constant slew rate magnitude that changes sign at random times. The instantaneous switching frequency may be controlled by a signal that is generated by integrating a random bit stream. The stream may repeat at a sub-audio frequency. The integrator may be lossy, so that the output does not wonder off to an arbitrary value. The frequency modulation signal may be filtered by a low pass filter.

20 Claims, 8 Drawing Sheets

(58) Field of Classification Search
USPC .......................................................... 307/52
See application file for complete search history.

(56) References Cited

U.S. PATENT DOCUMENTS

| | | | | |
|---|---|---|---|---|
| 5,101,206 | A * | 3/1992 | Riedel | H03M 1/14 341/120 |
| 5,309,082 | A * | 5/1994 | Payne | G05F 1/563 323/270 |
| 6,188,208 | B1 * | 2/2001 | Glaser | H02M 5/2576 323/235 |
| 6,242,982 | B1 * | 6/2001 | Ibelings | H03G 3/3042 330/129 |
| 6,510,068 | B1 * | 1/2003 | Bors | H02M 3/156 363/163 |
| 7,362,191 | B2 | 4/2008 | Chen et al. | |
| 7,741,918 | B1 * | 6/2010 | Li | H03C 3/0925 331/1 A |
| 8,072,277 | B1 * | 12/2011 | Li | H04B 1/69 331/78 |
| 9,748,845 | B1 * | 8/2017 | Kotikalapoodi | H02M 3/1584 |
| 2004/0232979 | A1 * | 11/2004 | Edwards | H03F 3/2173 330/10 |
| 2005/0168290 | A1 | 8/2005 | Parikh | |
| 2005/0243894 | A1 * | 11/2005 | Chen | H02M 1/44 375/139 |
| 2008/0119140 | A1 * | 5/2008 | Maligeorgos | H04B 1/40 455/67.13 |
| 2008/0297248 | A1 * | 12/2008 | Honda | H03F 3/2173 330/251 |
| 2009/0135885 | A1 * | 5/2009 | Lin | H04B 1/69 375/130 |
| 2010/0176852 | A1 * | 7/2010 | Lin | H03D 13/004 327/155 |
| 2012/0056683 | A1 | 3/2012 | Tang et al. | |
| 2012/0230369 | A1 * | 9/2012 | Zhang | H04B 1/71632 375/130 |
| 2012/0313701 | A1 * | 12/2012 | Khlat | H02M 3/07 330/127 |
| 2013/0051089 | A1 | 2/2013 | Pan et al. | |
| 2013/0241285 | A1 * | 9/2013 | Shieh | H02M 3/04 307/31 |
| 2014/0164801 | A1 * | 6/2014 | Busch | G06F 1/26 713/322 |
| 2014/0266121 | A1 * | 9/2014 | Wee | H02M 3/1588 323/283 |
| 2014/0375286 | A1 * | 12/2014 | Jiang | H02M 3/156 323/271 |
| 2015/0280560 | A1 * | 10/2015 | Guo | H02M 3/1584 323/271 |
| 2017/0134040 | A1 * | 5/2017 | Hamond | H03M 3/50 |
| 2017/0166078 | A1 * | 6/2017 | Elie | H02J 7/0021 |

FOREIGN PATENT DOCUMENTS

| | | |
|---|---|---|
| CN | 103947093 A | 7/2014 |
| CN | 107408882 | 11/2017 |
| EP | 3271999 A2 | 1/2018 |
| TW | 201134075 | 10/2011 |
| TW | 201212541 A | 3/2012 |
| TW | 201310878 A | 3/2013 |
| TW | 201637338 | 10/2016 |
| TW | I596878 | 8/2017 |
| WO | WO-2016148883 A2 | 9/2016 |
| WO | WO-2016148883 A3 | 10/2016 |

OTHER PUBLICATIONS

Office Action Taiwanese Patent Application No. 105107225 dated Mar. 28, 2017 with English translation.
"European Application Serial No. 16720586.3, Response filed Jan. 30, 2018 to Communication pursuant to Rules 161(1) and 162 EPC dated Oct. 26, 2017", 12 pgs.
"International Application Serial No. PCT/US2016/020022, International Preliminary Report on Patentability dated Sep. 28, 2017", 8 pgs.
"Chinese Application Serial No. 201680016657.4, Office Action dated Jun. 13, 2019", W/ English Translation, 14 pgs.
"Chinese Application Serial No. 201680016657.4, Response filed Oct. 25, 2019 to Office Action dated Jun. 13, 2019", w/ English Claims, 12 pgs.
"Taiwanese Application Serial No. 105107225, Response filed Jun. 26, 2017 to Office Action dated Mar. 28, 2017", w/ English Translation, 15 pgs.
"Chinese Application Serial No. 201680016657.4, Office Action dated Mar. 3, 2020", W/English Translation, 9 pgs.

* cited by examiner

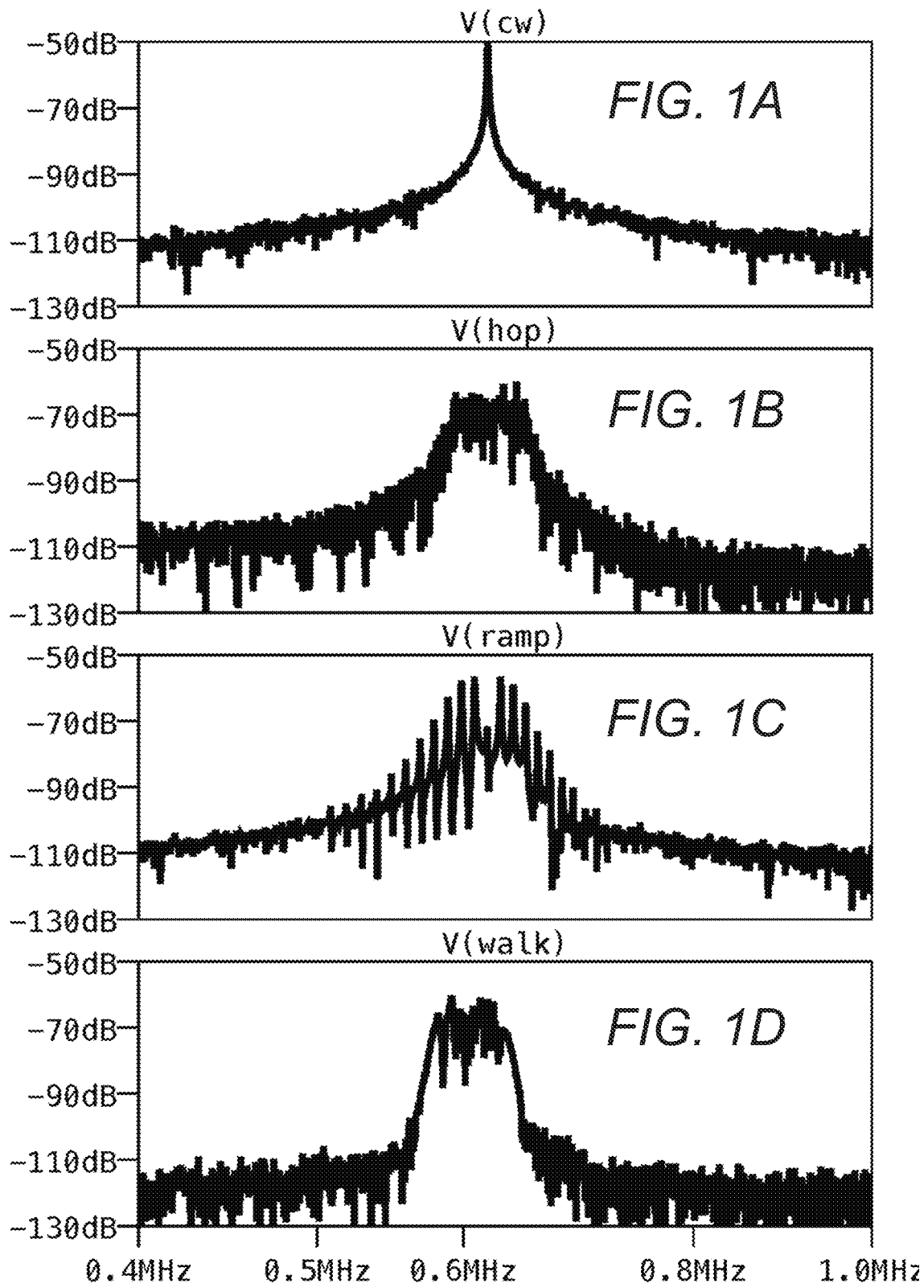

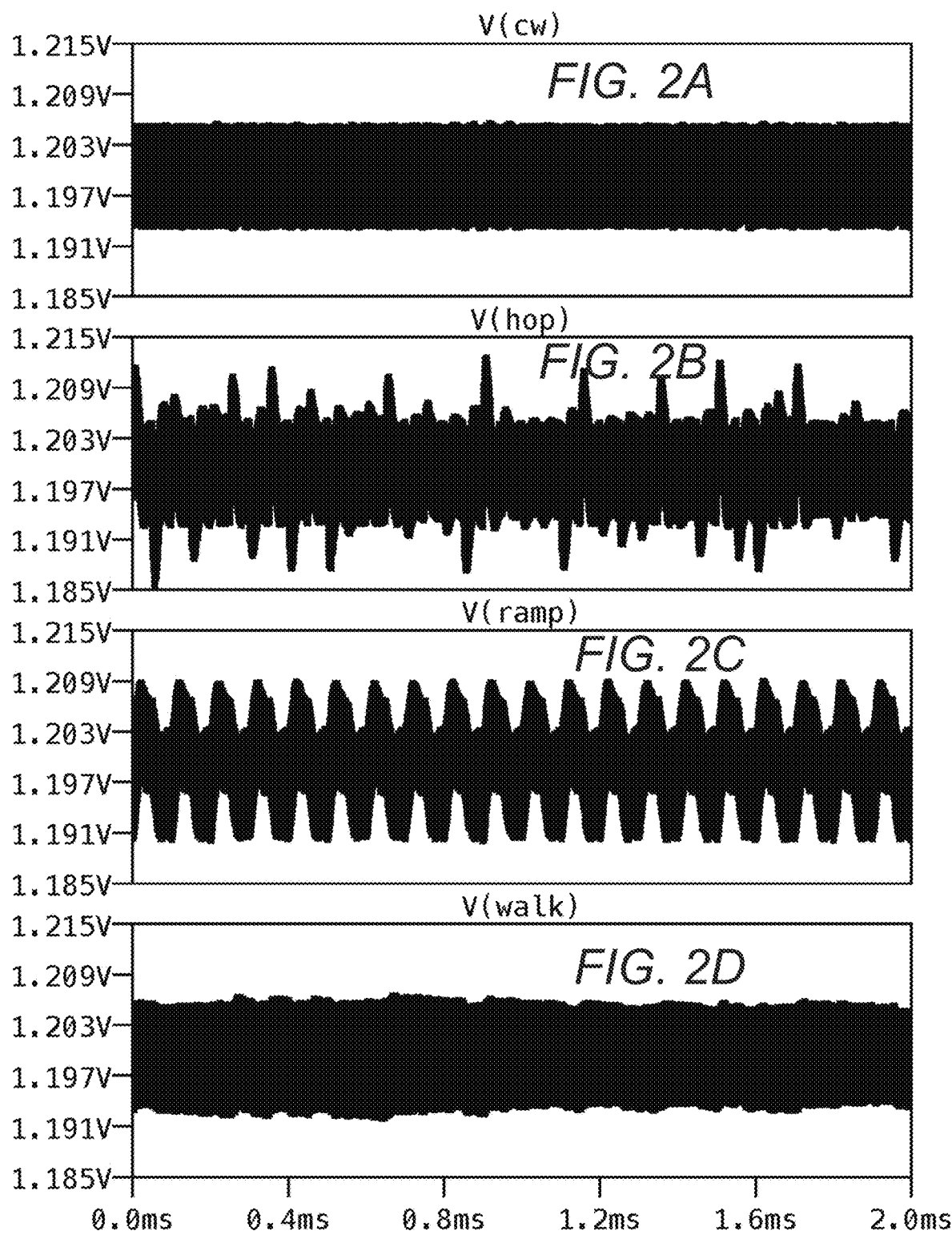

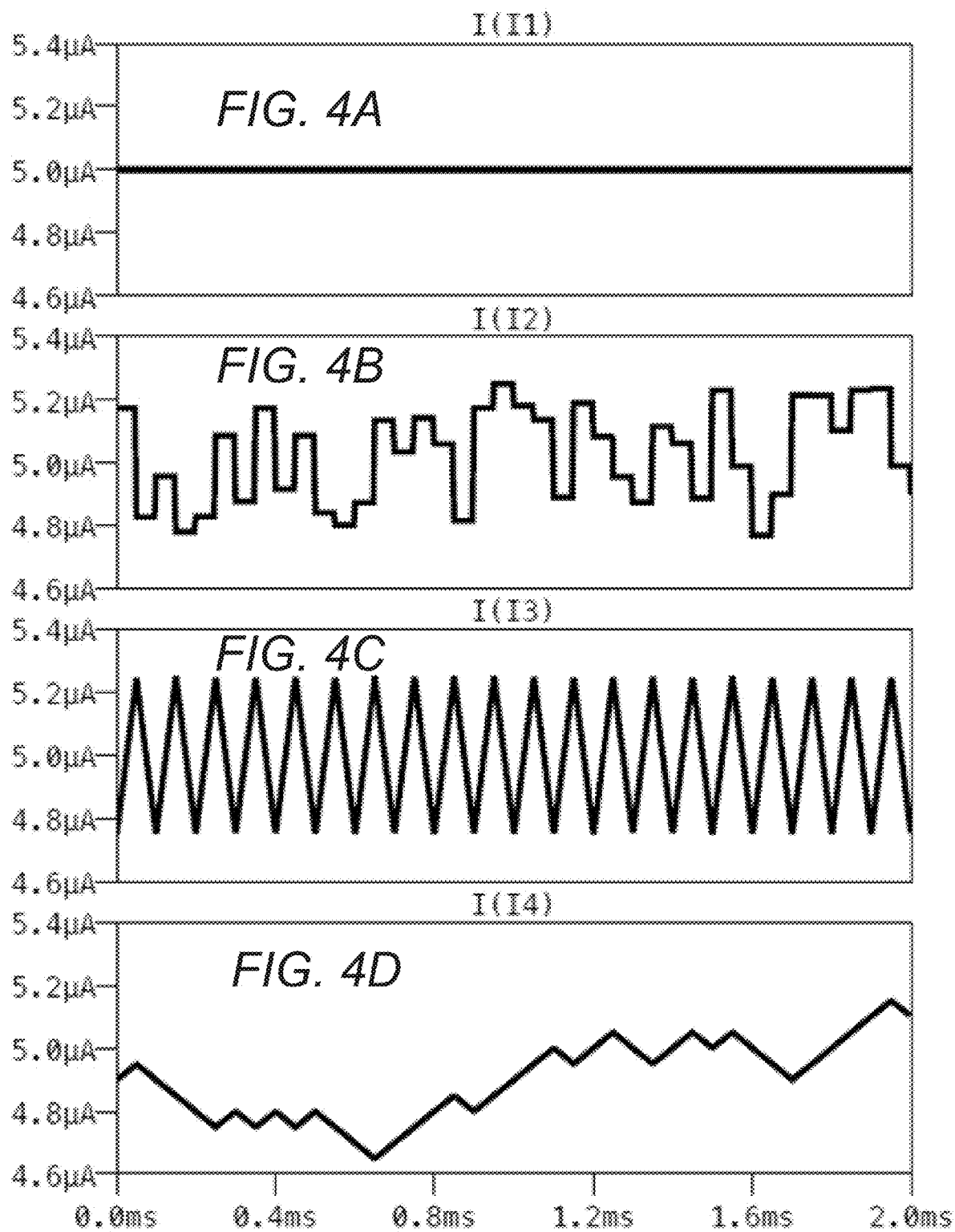

SPREAD SPECTRUM FOR SWITCH MODE POWER SUPPLIES

CROSS-REFERENCE TO RELATED APPLICATION

This application is based upon and claims priority to U.S. provisional patent application 62/135,553, entitled "Spread Spectrum for Switch Mode Power Supplies," filed Mar. 19, 2015. The entire content of this application is incorporated herein by reference.

BACKGROUND

Technical Field

This disclosure relates to switch mode power supplies and to spread spectrum technology.

Description of Related Art

Switch mode power supplies can have noise in their outputs due to switching that takes place in the power supply.

One approach for reducing the impact of this noise is to vary the frequency of the switching during operation of the switch mode power supply using spread spectrum technology.

Unfortunately, using spread spectrum technology can produce less than ideal results. The approach can reduce a birdie at the switching frequency and harmonics thereof, but can also generate additional noise on the output, impairing the performance as seen in the time domain.

Frequency hopping can be used to change the switching frequency. This approach changes the frequency at random, hopping from frequency to frequency. However, a new compensation node voltage in the switch mode power supply may need to be found for each frequency hop, since inductor ripple current may vary with frequency. A current mode feedback loop in the switch mode power supply may therefore need to settle to a new peak current after each frequency hop, impairing the performance of the power supply.

Frequency ramping can also be used to change the switching frequency. This approach modulates the clock in the switch mode power supply with a triangular wave to spread out the noise, but to keep the generated noise closer to the switching frequency, instead of over all frequencies. An example of this is described in U.S. Pat. No. 7,362,191. But the triangular wave can still generate multiple smaller birdies at the cost of somewhat smaller excursions on the output voltage in the time domain.

SUMMARY

A switch mode power supply may utilize a switching signal to control one or more power switches in the switch mode power supply.

A switch mode power supply controller may generate and/or control this switching signal.

The controller may reduce the peak spectral noise of the switch mode power supply by varying the instantaneous switching frequency at a constant slew rate magnitude that changes sign at random times. This is referred to herein as a "random frequency walk."

The instantaneous switching frequency may be controlled by a signal that is generated by integrating a random bit stream. The stream may repeat at a sub-audio frequency. The integrator may be lossy, so that the output does not wonder off to an arbitrary value. The frequency modulation signal may be filtered by a low pass filter.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIGS. 1A-1D illustrate the output of example switch mode power supplies in the frequency domain. FIG. 1A illustrates the output from a supply that does not utilize spread spectrum technology, FIG. 1B from a supply that utilizes frequency hopping, FIG. 1C from a supply that utilizes frequency ramping, and FIG. 1D from a supply that utilizes a random frequency walk.

FIGS. 2A-2D illustrates the output of example switch mode power supplies in the time domain. FIG. 2A illustrates the output from a supply that does not utilize spread spectrum technology, FIG. 2B from a supply that utilizes frequency hopping, FIG. 2C from a supply that utilizes frequency ramping, and FIG. 2D from a supply that utilizes a random frequency walk.

FIGS. 4A-4D illustrates examples of voltage controlled current waveforms for an example switch mode power supplies. The supply in FIG. 4A does not utilize spread spectrum technology, the supply in FIG. 4B utilizes frequency hopping, the supply in FIG. 4C utilizes frequency ramping, and the supply in FIG. 4D that utilizes a random frequency walk.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

As indicated above, spread spectrum technology can be used to reduce the peak frequency domain noise in the outputs of switch mode power supplies (SMPS). However, the approaches of frequency hopping and frequency ramping can produce less than ideal results.

Another approach is to keep the frequency slewing at a constant rate, but to randomly change the direction of the slewing. A modified pseudo random number generator may be used to reduce birdies caused by the clock of a SMPS using a number generator that may have a minimum impact on output excursions in the time domain. This may give better suppression of the original switching frequency birdie, while generating less broadband frequency noise and almost zero time domain noise. The approach may allow the current mode control loop in the switch mode power supply to stay in regulation, while not generating any coherent frequencies that could cause birdies.

This approach may work better than frequency hopping because the compensation loop in the switch mode power supply may not be jolted around. The approach may also work better than using a distorted saw waveform, as described in U.S. Pat. No. 7,362,191, because it may not require the modulation signal to treated in a coherent manner so that the FM sidebands diffract (destructively interfere) in an application specific manner to the desired hack to squeak through a specification as checked by a tester.

FIGS. 1A-1D illustrates the output of an example switch mode power supply in the frequency domain. FIG. 1A illustrates the output from a supply that does not utilize spread spectrum technology, FIG. 1B from a supply that utilizes frequency hopping, FIG. 1C from a supply that utilizes frequency ramping, and FIG. 1D from a supply that utilizes a random frequency walk.

FIGS. 2A-2D illustrates the output of an example switch mode power supply in the time domain. FIG. 2A illustrates the output from a supply that does not utilize spread spectrum technology, FIG. 2B from a supply that utilizes frequency hopping, FIG. 2C from a supply that utilizes frequency ramping, and FIG. 2D from a supply that utilizes a random frequency walk.

Figure 3A:
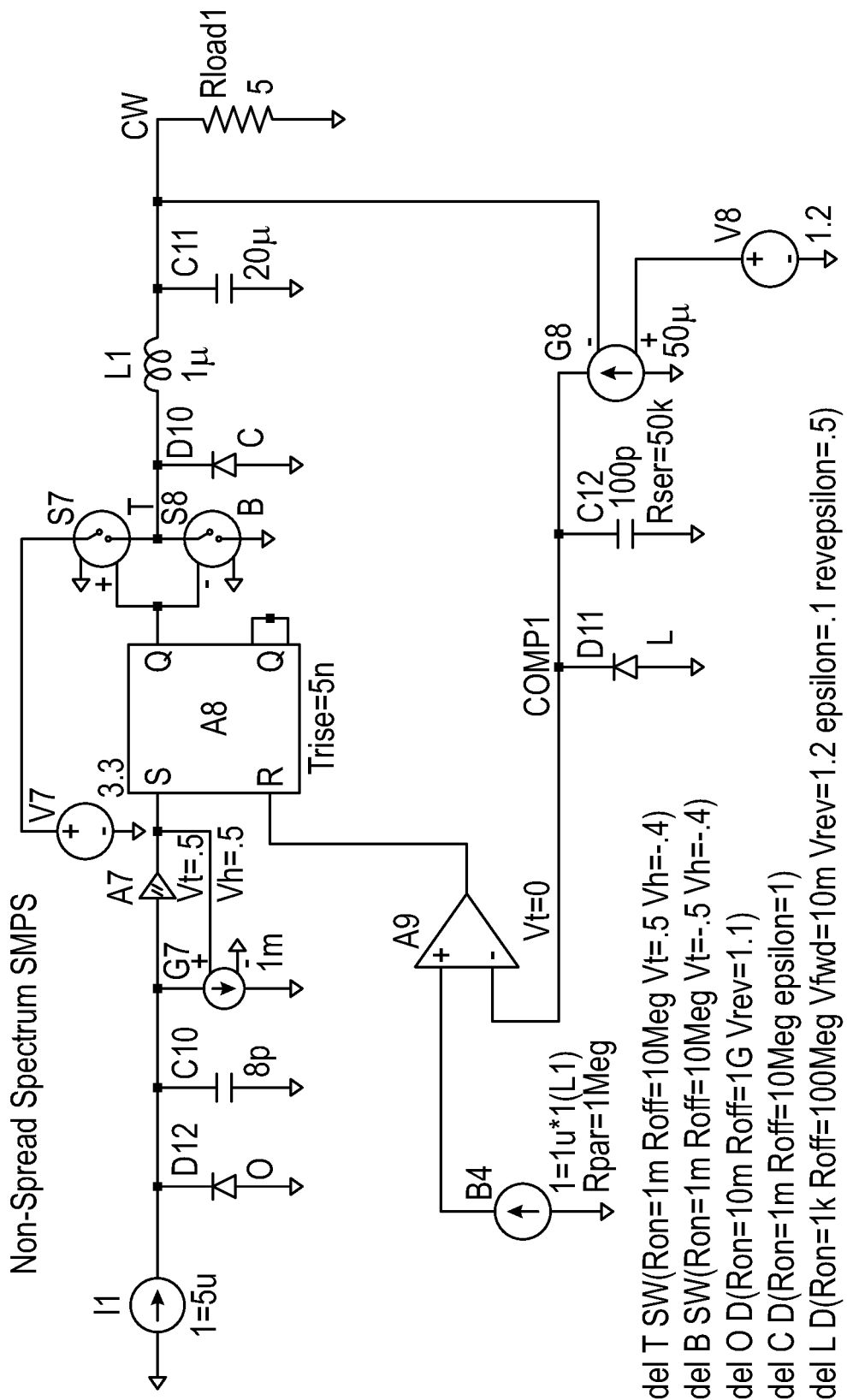
FIGS. 3A-3D illustrates schematics of example switch mode power supplies. The supply in FIG. 3A does not utilize spread spectrum technology, the supply in FIG. 3B utilizes frequency hopping, the supply in FIG. 3C utilizes frequency ramping, and the supply in FIG. 3D utilizes a random frequency walk.

FIGS. 3A-3D illustrates schematics of example switch mode power supplies. The supply in FIG. 3A does not utilize spread spectrum technology. The supply in FIG. 3A is a buck switch mode power supply that is operated in peak current mode and has forced continuous inductor current due to synchronous rectification. The input is a voltage source V7. The output is at a node CW which is loaded by a resistor Rload1. An inductor L1 and a capacitor C11 may form an output filter.

The clock may include a diode D12, a capacitor C10, a transconductance G7, and a Schmitt trigger A7. The Schmitt trigger output may be 0 volts when reset and 1 volt when set. An input voltage on the Schmitt trigger of less than or equal to 0 volt mays may reset the Schmitt trigger and a voltage greater than or equal to 1 volt may set the Schmitt trigger. At the beginning of each clock cycle, A7 may not be set and it's output may be 0 volts so that a current in G7 is zero. A current source I1 may supply a constant 5 microamp current to charge the capacitor C10 up until the Schmitt trigger is set. Once set, the output of A7 may be 1 volt and the current of G7 may be 1 milliamp, quickly discharging C10 until A7 resets, current G7 is again zero, and the current source I1 can again charge up C10.

These components may generate a clock signal with a repetition frequency set by the current source I1. The frequency may be constant because the current source I1 may be a constant 5 microamp.

When A7 is set, a flop-flop A8 may be set, a synchronous rectifier switch S8 may turn off, and a switch S7 may turn on. When S7 is on, the current in L1 may ramp up until its current is proportional to the voltage, V(comp1), on the output of an error amplifier. The error amplifier may include the reference voltage V8, a transconductance G8, a compensation network C12 and a diode D11. The inductor current may be sensed with a behavioral current source B4 and converted to a voltage via its built in shunt resistance of 1e6 ohms.

A comparator A9 may detect when the inductor current has reached the appropriate value and reset the flip-flop A8, turning off the switch S7 and turning on the switch S8. The commutation timing may be adjusted such that S7 and S8 are never both on at the same time. A diode D10 may catch the inductor current while both switches S7 and S8 are off.

The diode D11 may limit the output voltage range of the error amplifier. The diode D12 may limit the voltage range on the timing capacitor.

The model statements shown in FIG. 3A may define the properties of the switches and diodes. The model definition for S7 may be ".model T SW(Ron=1 m Roff=10 Meg Vt=0.5 Vh=−0.4)" This means that the on resistance may be 1 milliohm, the off resistance may be 10 megaohm, the control threshold voltage may be 0.5 volt, and the hysteresis may be −0.4 volt. The negative hysteresis may mean that the switch smoothly transitions from off to on as the control voltage varies from 0.1 volt to 0.9 volt.

The model definition for the switch S8 may be ".model B SW(Ron=1 m Roff=10 Meg Vt=−0.5 Vh=−0.4)" This means that the on resistance may be 1 milliohm, the off resistance may be 10 megaohm, the control threshold voltage may be −0.5 volt, and the hysteresis may be −0.4 volt. The negative hysteresis may mean that the device may smoothly transition from off to on as the control voltage increases from −0.9 volt to −0.1 volt.

The diode D12's model statement may be ".model O D(Ron=10 m Roff=1 G Vrev=1.1)." This means that it may be an ideal diode with 10 milliohm on resistance, 1 gigaohm off resistance, zero forward voltage drop, and a reverse breakdown voltage of 1.1 volt.

The Diode D10's model statement may be ".model C D(Ron=1 m Roff=10 Meg epsilon=1)." This may be the catch diode for the period when both S7 and S8 are off. The model states that the diode may have an off resistance of 10 megaohm and an on resistance of 1 milliohm, but parameter epsilon means that there may be a 1V region of smooth transition between off and on.

The .model statement that reads ".model L D(Ron=1K Roff=100 Meg Vfwd=10 m Vrev=1.2 epsilon=0.1 revepsilon=0.5)" may be for the diode that limits the output voltage range of the error amplifier. The model defines the limit to swing nominally from −10 millivolt to 1.2 volts. The clock frequency may be set by the current I1, which may be constant in the non-spread spectrum case.

Figure 3B:
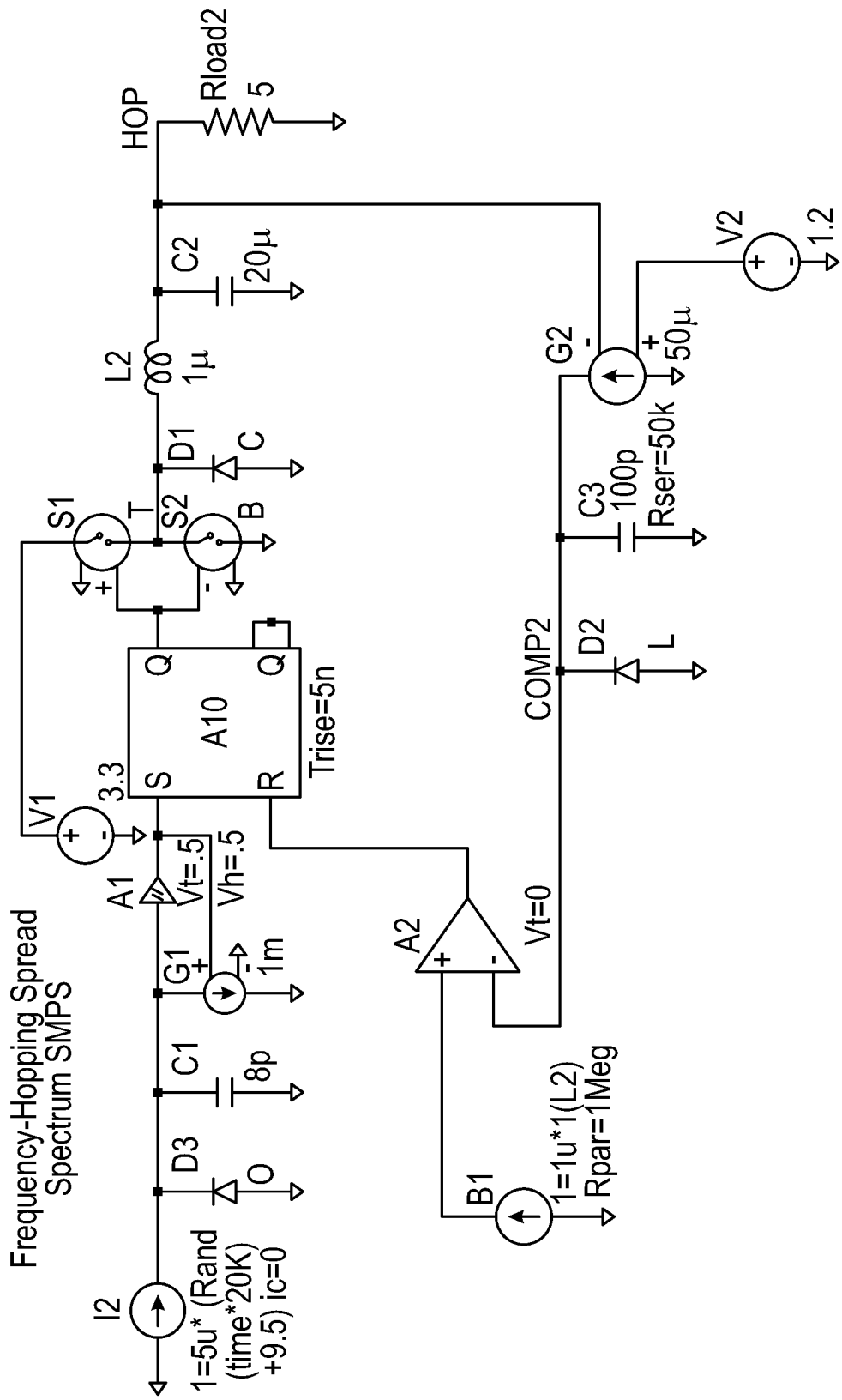

FIG. 3B illustrates a schematic of an example switch mode power supply that utilizes frequency hopping. The components in FIG. 3B may be the same as the corresponding components in FIG. 3A, except for a time-varying current source that may charge up a clock timing capacitor C1 versus the capacitor C10 in FIG. 3A. Whereas FIG. 3A may have a constant current source I1 to make a constant clock period and hence frequency, FIG. 3B may have a behavioral current source I2 that periodically steps to a new level to cause an abrupt change in clock period and corresponding frequency. The current source I2's current may be given by the expression "I=0.5u*(Rand(time*20K)+9.5)." This may use the function Rand( ) which may return a random number between 0 and 1 depending on the integer value of the argument, time*20K, or time times twenty thousand. Using this function Rand( ) in the expression 5u*(Rand(time*20K)+9.5) may mean that behavioral current source I2's current hops to a new random value between 4.75 microamp to 5.25 microamp twenty times a second, instead of being a constant current of 5 microamp, as the current source I1 supplies in FIG. 3A. The clock frequency may be set by current I(I2).

Figure 3C:
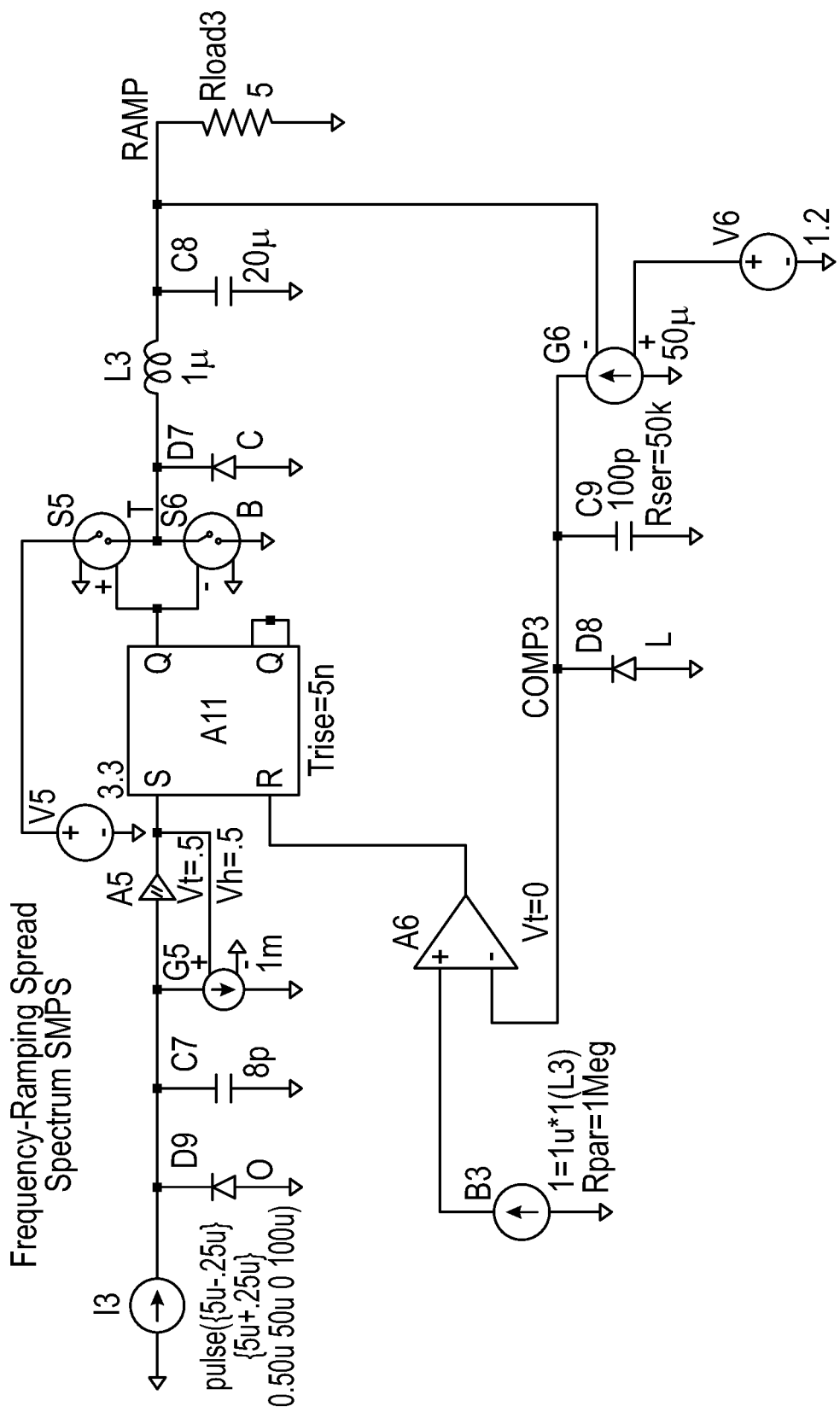

FIG. 3C illustrates a schematic of an example switch mode power supply that utilizes frequency ramping. The components in FIG. 3C may be the same as the corresponding components in FIG. 3A, except for the time-varying current source that charges up a clock timing capacitor C7 in FIG. 3C versus C10 in FIG. 3A. Whereas FIG. 3A may have the constant current source I1 to make a constant clock period and hence frequency, FIG. 3C may have a behavioral current source I3 that may regularly ramp the clock period and hence frequency up and down. The current source I3 may yield a triangular wave that ramps from 4.75 microamp to 5.25 microamp and back every 100 microseconds. The clock frequency may be set by current source I3.

Figure 3D:
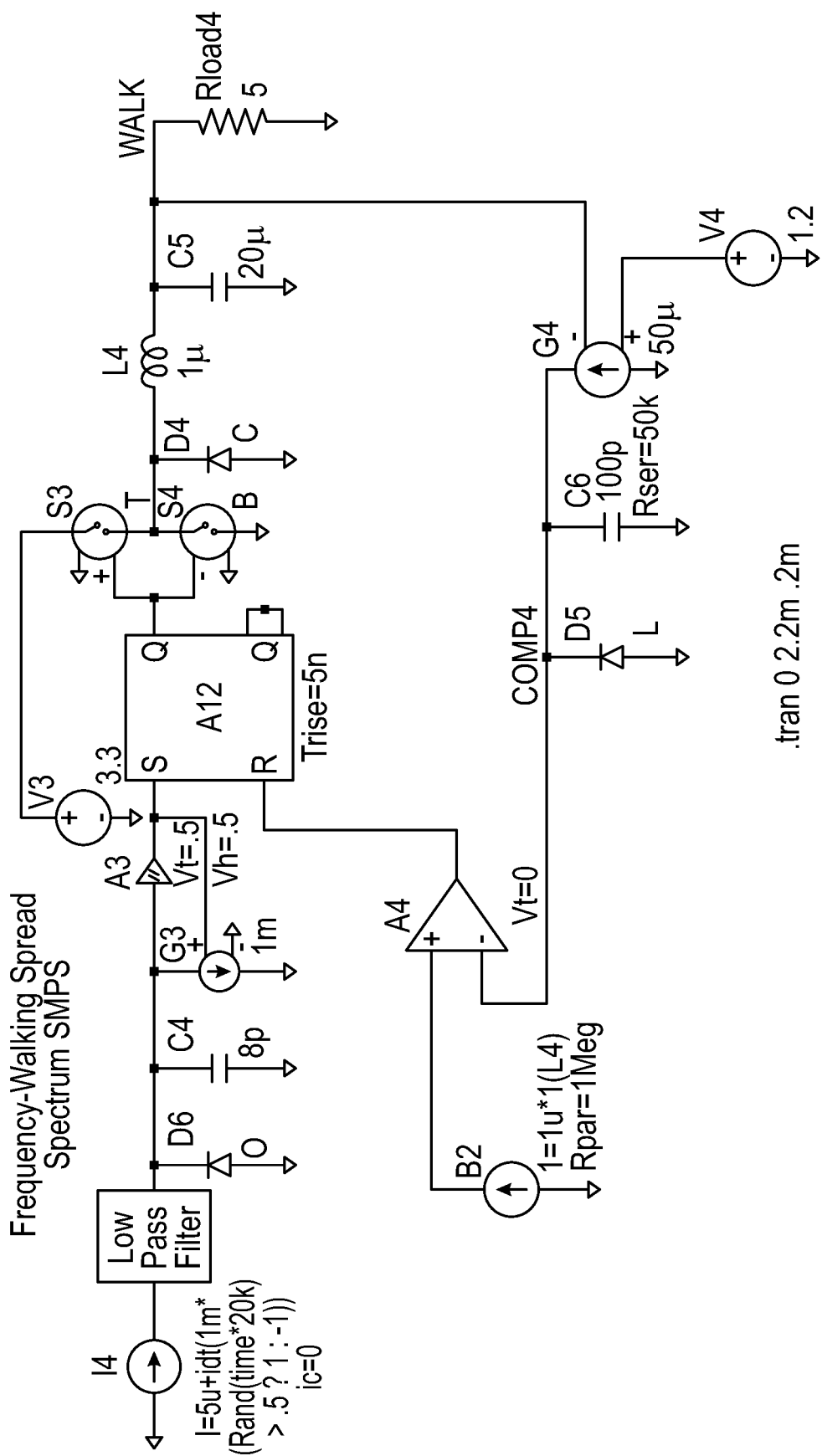

FIG. 3D illustrates a schematic of an example switch mode power supply that utilizes a random frequency walk. The components in FIG. 3D may be the same as the corresponding components in FIG. 3A, except for the time-varying current source that may charge up a clock timing capacitor C4 in FIG. 3D versus C10 in FIG. 3A. Whereas FIG. 3A may have the constant current source I1 to make a constant clock period and hence frequency, FIG. 3D may have a behavioral current source I4 that slews at a constant magnitude but random direction. The current source I4's current may be given by the expression "I=5u+idt(1 m*(Rand(time*20K)>0.5 ?1:−1))." Again, the function Rand( ) may be used to return a random number between 0 and 1, depending on the integer value of its argument, but the value may be boolean compared to 0.5 which yields either a 0 or 1. That is, "Rand(time*20K)>0.5 ?1:−1)" may be an expression for a random bit stream at 20,000 baud. This bit stream may then be scaled as shown in the figure by a factor of 1 m (engineering notation for 0.001), integrated via the function idt( ) and then added to 5 microamp, yielding a current that may slew at a constant magnitude, but randomly up or down, centered at 5 microamp. This current may be used to charge timing capacitor C4 and may make the switch mode power supply switching frequency randomly walk up or down. The clock frequency may be set by the current source I4.

FIGS. 4A-4D illustrates examples of voltage controlled current waveforms for an example switch mode power supplies. The supply in FIG. 4A does not utilize spread spectrum technology, the supply in FIG. 4B utilizes frequency hopping, the supply in FIG. 4C utilizes frequency ramping, and the supply in FIG. 4D utilizes a random frequency walk.

Figure 5:
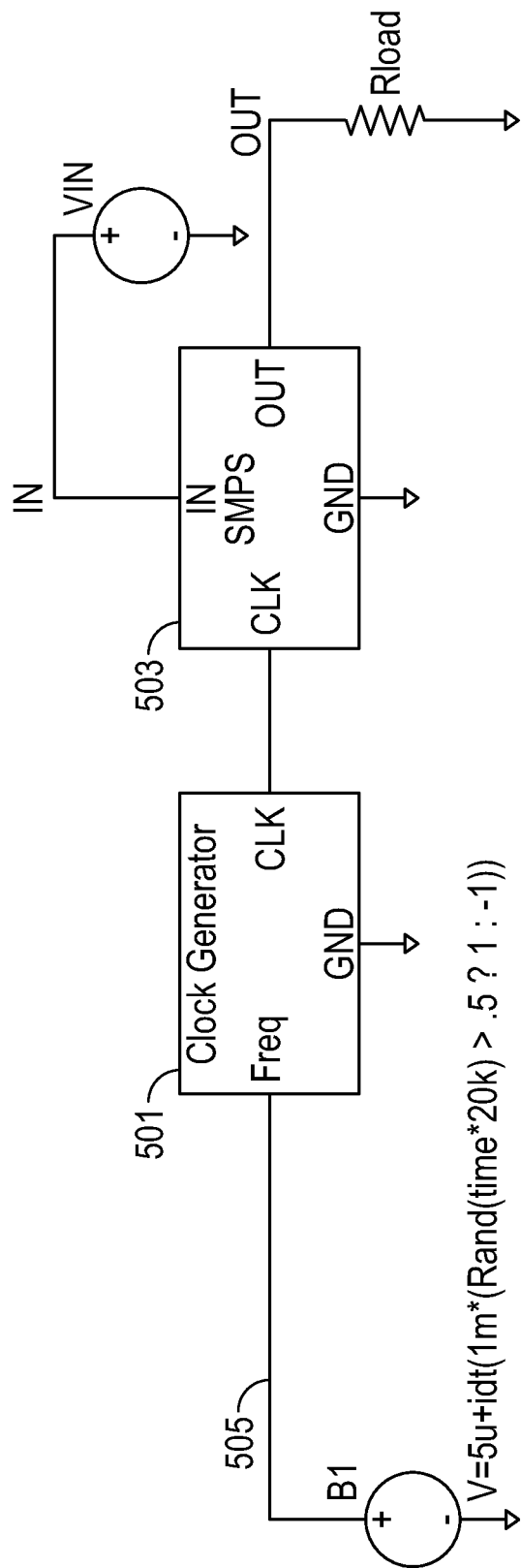
FIG. 5 shows a block diagram of an example of a switch mode power supply that switches at an externally applied clock frequency.

FIG. 5 shows a block diagram of an example of a switch mode power supply that switches at an externally applied clock frequency. A clock generator 501 may generate a clock signal for an SMPS 503. The clock generator clock frequency may be controlled by an external signal applied at an input 505. A behavioral source B1 may generate a signal that is an integrated random bit stream to control the clock generator 501. The switch mode power supply may be an SMPS that uses a clock frequency that slews at a constant slew rate, but random direction up or down.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

For example, the described approaches may be applied to topologies other than buck, such as but not limited to boost, buck-boost, SEPIC, flyback, Cuk, zeta, and forward. The described approaches are also useful for non-current mode switch mode power supplies, because the clock, with its frequency controlled by a random walk, may still disguise the birdie as stochastic noise with lower peak amplitude in the frequency domain. The described approaches may be applied to non-forced continuous inductor current switch mode power supplies and non-synchronous switch mode power supplies. Also, the described approaches may not have to be implemented with a current controlled oscillator, but any type of oscillator that can be controlled with a signal that slews at a constant magnitude, but random direction up or down. The described approaches may also be used in conjunction with a low pass filter between the signal that varies at constant magnitude slew rate, but random direction, and the frequency controlled oscillator.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

What is claimed is:

1. A controller for generating a switching signal to reduce peak spectral noise of a switch mode power supply without monitoring an output frequency characteristic of the switching signal, the controller comprising:
   a signal source configured to generate a clock frequency control signal, wherein the clock frequency control signal has a substantially constant slew rate magnitude, has a non-zero and substantially constant mean value, and has a sign that changes randomly over time; and
   a clock circuit configured to generate the switching signal to control one or more power switches in the switch mode power supply, wherein a frequency of the switching signal changes according to corresponding changes in the clock frequency control signal, and a mean frequency of the switching signal is substantially constant.

2. The controller of claim 1, wherein the clock circuit generates the switching signal with a constant slew rate.

3. The controller of claim 1, wherein the signal source includes a current source coupled to a timing capacitor, and wherein changes in the switching signal correspond to changes in a charge status of the timing capacitor.

4. The controller of claim 1, wherein the clock circuit is configured to generate the switching signal without using a phase locked loop.

5. The controller of claim 1, wherein the signal source comprises an integrator circuit configured to receive a random bit stream signal and, in response, provide the clock frequency control signal.

6. The controller of claim 5, wherein the random bit stream signal repeats at a sub-audio frequency.

7. The controller of claim 5, wherein the integrator circuit is lossy.

8. The controller of claim 5, further comprising a low pass filter that filters the clock frequency control signal generated by the integrator circuit.

9. A switch mode power supply with reduced peak spectral noise, the switch mode power supply comprising:
   one or more power switches;
   a signal source configured to generate a clock frequency control signal, wherein the clock frequency control signal has a substantially constant slew rate magnitude, has a non-zero and substantially constant mean value, and has a sign that changes randomly over time; and
   a controller that generates a control signal without monitoring an output frequency characteristic of the switching signal, wherein the control signal is based on the clock frequency control signal, the control signal controls the one or more power switches, a frequency of the control signal changes according to corresponding changes in the clock frequency control signal, and a mean frequency of the switching signal is substantially constant.

10. The switch mode power supply of claim 9, wherein the controller generates the control signal and the control signal has a constant slew rate.

11. The switch mode power supply of claim 9, wherein the controller comprises a current source coupled to a timing capacitor, wherein the current source provides a current signal to the timing capacitor and the current signal from the current source clews at a constant magnitude and random direction, and wherein the control signal corresponds to a charge status of the timing capacitor.

12. The switch mode power supply of claim 9, wherein the signal source comprises an integrator circuit configured to receive a random bit stream signal and, in response, provide the clock frequency control signal.

13. The switch mode power supply of claim 12, wherein the random bit stream repeats at a sub-audio frequency.

14. The switch mode power supply of claim 12, wherein the integrator circuit is lossy.

15. The switch mode power supply of claim 12, wherein the controller further comprises a low pass filter that filters the output clock frequency control signal from the integrator circuit.

16. A method for generating a switching signal and reducing noise in a switch mode power supply without monitoring an output frequency characteristic of the switching signal, the switching signal used to control one or more power switches in the switch mode power supply, the method comprising:
   generating a clock frequency control signal based on a random bit stream, wherein the clock frequency control signal has a substantially constant slew rate magnitude, a non-zero and substantially constant mean value, and a sign that changes randomly over time; and
   generating the switching signal that controls the one or more power switches, wherein the switching signal is based on the clock frequency control signal, the switching signal changes according to corresponding changes in the clock frequency control signal, and a mean frequency of the switching signal is substantially constant.

17. The method of claim 16, wherein the random bit stream repeats at a sub-audio frequency.

18. The method of claim 16, further comprising using an integrator circuit to generate the clock frequency control signal, and wherein the integration by the integrator circuit is lossy.

19. The method of claim 16, further comprising low pass filtering the clock frequency control signal.

20. The method of claim 16, wherein the generating the switching signal comprises using a current source to charge a timing capacitor, the current source configured to provide a current signal that stews at a constant magnitude and random direction, and wherein the switching signal corresponds to a charge status of the timing capacitor.

* * * * *